Oct. 30, 1945. E. A. DERUNGS 2,388,043
SELECTING CONTROL DEVICE
Filed Aug. 4, 1943 3 Sheets-Sheet 2

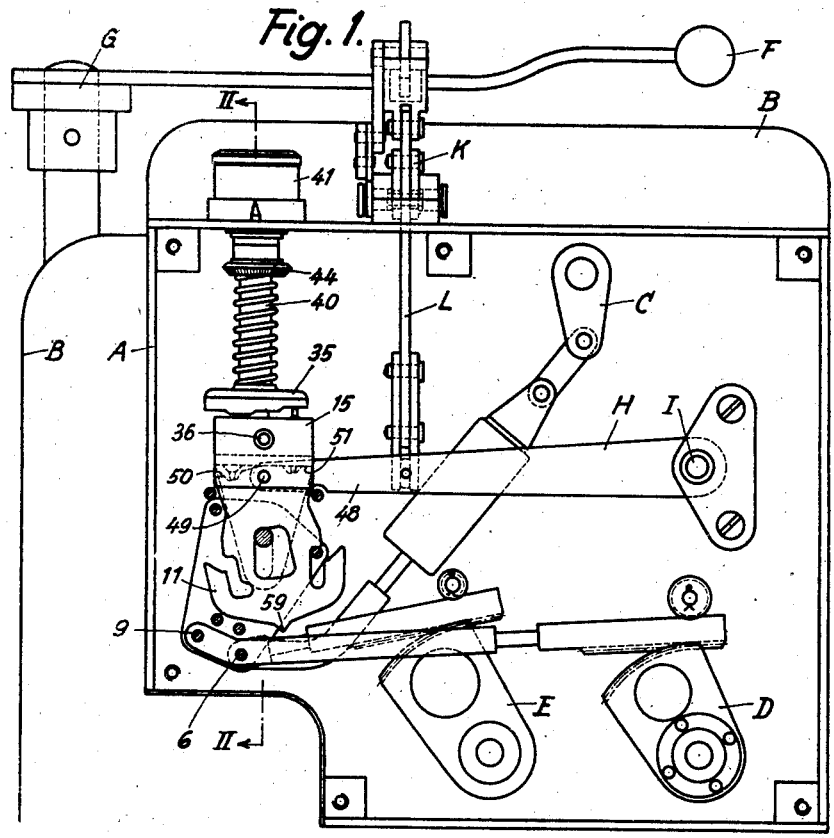
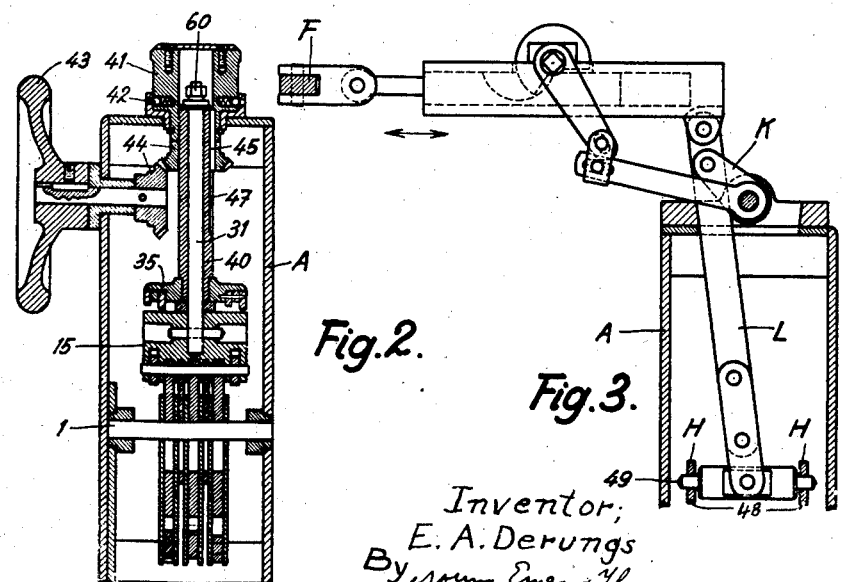

Inventor:
E. A. Derungs
By Young, Emery & Thompson
Attys.

Oct. 30, 1945. E. A. DERUNGS 2,388,043
SELECTING CONTROL DEVICE
Filed Aug. 4, 1943 3 Sheets-Sheet 3

Inventor,
E. A. Derungs
Attys.

Patented Oct. 30, 1945

2,388,043

UNITED STATES PATENT OFFICE 2,388,043

SELECTING CONTROL DEVICE

Ernest Alphonse Derungs, Le Locle, Switzerland

Application August 4, 1943, Serial No. 497,376
In Switzerland December 23, 1941

12 Claims. (Cl. 74—473)

Speed variation in certain machine tools or mechanical traction vehicles is generally obtained by gear sets controlled by means of levers or cranks. Similar means is used for varying the relative position of certain elements in signalling apparatus. When the speed variation requires the intercalation or the exclusion or even both intercalation and exclusion of several gear sets or signal controlling means, these operations had hitherto to be made successively with the machine at rest or with the parts of the apparatus in a neutral position. The result was not only a loss of time, but also errors in the selection of the combinations whereby accidents were possible.

The object of the invention is to remedy these inconveniences. The invention provides a mechanical selecting control device which, whatever the speed or, in general, the relative position of the parts to be influenced of the apparatus or machine may be, allows selection in advance of the next speed of the machine or the future grouping of the said parts by a simple displacement of a member of the selecting device in question.

To obtain this result, the selecting control device according to the invention comprises selecting tilting members capable of acting in different ways upon the parts to be displaced of the machine or of the apparatus to which the selecting control device is applied, according as said members are in one or another position imposed on them by a variable combination of bearing points previous to each change in the relative position of the said parts to be displaced.

The number of these selecting tilting members alters according to the requirements and the means for giving them different positions may also vary.

The accompanying drawings show, by way of example an embodiment of the selecting control device for use in a machine tool in which the speed of the spindle must be varied in accordance with the existing requirements. In the present case, this speed depends on the reciprocal position of cranks operating gear sets not shown. Each crank can occupy three positions and the combinations of these positions give the desired speed. These combinations are controlled by the selecting tilting members described later on.

Fig. 1 is a front view of the selecting control device,

Fig. 2 is a section along the line II—II in Fig. 1 and

Fig. 3 is a side view of a transmitting device,

Fig. 4 being a side view of Fig. 5.

Figure 4:
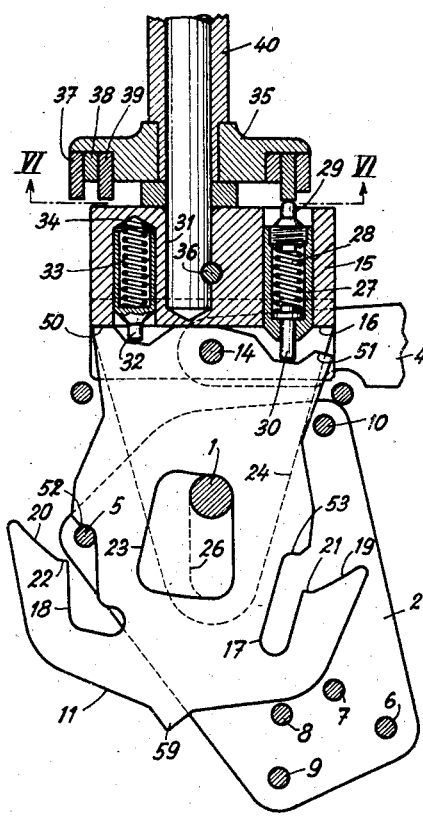
Fig. 4 is a view, partly in section, of the selecting set of the apparatus, on a larger scale than in Fig. 1.
Figure 5:
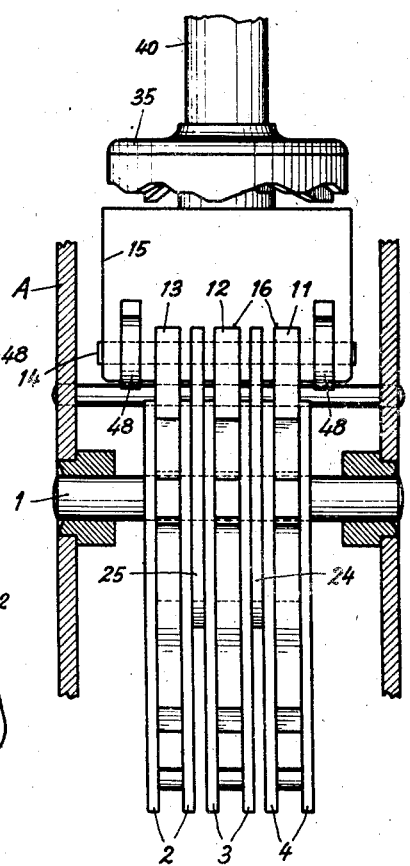

All the main parts of the selecting control device are arranged in a box A certain contours of which are indicated by B. The different speeds of the machine in question are obtained by nonrepresented gear sets controlled by cranks C, D, E. These latter are connected to the actual selecting device either by elastic connections or by toothed racks. The engaging and disengaging lever of the machine is designated by F. It is pivoted at G and serves also, for the operation of the selecting control device, as will be explained later on. On the walls of the box A the axle 1 is mounted on which three control plates 2, 3, 4 are pivoted (Figs. 4 and 5). Each of these plates comprises two discs interconnected by distance pins 5, 6, 7, 8, 9, 10, also other purposes: The pins 6 and 9 are connected to the transmitting device (in the special case, only one of these pins is used); the pins 7 and 8 serve for the determination of a special position of members which will be described later on; 5 and 10 are the pins for operating the control plates, as will be seen hereinafter.

Between the discs of the control plates 2, 3, 4 selecting tilting members 11, 12, 13 are placed (Fig. 5). They oscillate about an axle 14 traversing a block 15, the members 11, 12, 13 entering grooves 16 of the same (Fig. 5). These selecting tilting members have cut-outs 17 and 18 separating two arms from the median part which lie symmetrically with regard to the longitudinal axis of the tilting members and end in faces 19, 20 forming part of the envelope of a cylinder having its axis in the axle 14. Small stops 21, 22 are provided on the ends of the said cylindrical faces 19, 20. An opening 23 gives free passage to the axle 1 and allows each selecting tilting member to execute movements around the axle 14.

To the block 15 triangular plates 24, 25 are fixed, having a guiding slot 26 traversed by the axle 1 and adapted to limit the course of all the members which can move with the block 15.

Figure 6:
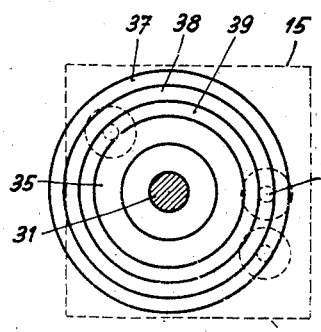
Fig. 6 is a section along line VI—VI in Fig. 4, Figs. 7 to 10 are front views of certain parts of the selecting device represented in different positions in order to show the manner of operation of the device.

In this block 15 main pushers 27 are lodged, which have a hollow member containing a spring 28 bearing against the bottom 29 of the pusher and pressing a contact piece 30 towards the outside which is, thereby, always supported on a notch of the corresponding selecting tilting member. There is a main pusher for each tilting member and these pushers are distributed around the axle 31 of a cam carrier described later on in such a manner that they lie on different circles around this axle (Fig. 6).

To each main pusher 27 corresponds a counter pusher 32 with a fixed contact piece. This counter pusher is lodged in a cavity 34 of the block 15 and is constantly under the influence of a spring 33 which is weaker than the spring 28 of the corresponding main pusher 27 and bearing on the bottom of the cavity 34.

To the block 15 is fixed by means of the pin 36 the fixed axle 31 of a cam carrier 35 whose circumference is provided with bell-shaped cams 37, 38, 39, the lobes of each of said cams engaging a main pusher corresponding to one of the selecting tilting members 11, 12, 13. The cam carrier 35 has a hollow sleeve 40 by means of which it is, in direction of rotation only, fixed with the help of key 45 sliding in a groove 47 of the sleeve 40 to an indicator 41 (Fig. 2). This latter can be arrested by means of balls 42 in determined positions corresponding to certain combinations of the lobes of the cams 37, 38, 39 and, consequently, to different positions of the main pushers. In the special case, the adjustment of these positions of the indicator is obtained by means of a hand wheel 43 and a bevel gear 44, but these parts might be omitted and the indicator may be directly manipulated. A lever H is pivoted on the box A by means of the bolt I and has a forked end 48 whose legs carry pins 49 penetrating into the block 15. This lever H is connected with a disengaging lever F by a transmitting device illustrated in Fig. 3. From Figs. 1 and 3 it may be seen that, on each manipulation of the lever F in the direction of the arrows, the crank K, which is connected with the lever H by a rod L, lifts the block 15 by the intermediary of these two parts H and L and afterwards allows the block 15 to resume its first position. During this interval and by this movement the selection of the new operating condition is effected.

Figure 7:
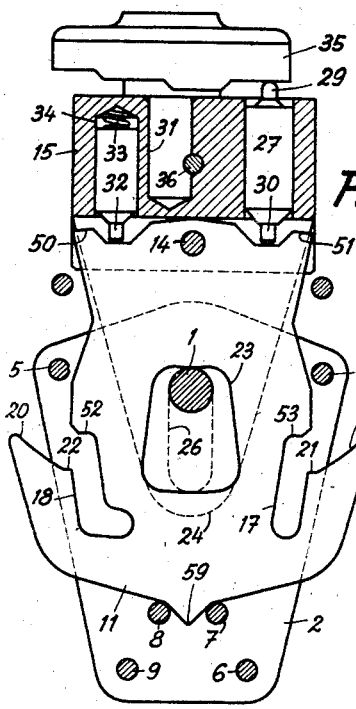

The operation of the apparatus is as follows:

All the selecting tilting members 11, 12, 13, in their median position, are in a state of equilibrium because the height of the lobes of the cams 37, 38, 39 is everywhere equal to half the difference between the maximum and the minimum of the useful height of these lobes and because, therefore, all the main pushers 27 have their contact pieces at the same height as those of the counter pushers 32. Presuming also that all the gear sets are out of action, all the control plates 2, 3, 4 stand vertically and the centering points 59 of each selecting tilting member lie between the centering pins 7 and 8. This position is shown in Fig. 7.

From this represented position, each selecting tilting member may move into two other positions according as either its catch 50 or 51 bears on the block 15, that is, according as the main pusher 27 is on a maximum or a minimum lobe of the corresponding cam 37, 38 or 39. As the following operations are the same for each of the cams 37, 38, 39 it is sufficient to describe them for one selecting tilting member only. In the position of Fig. 7 all the movable parts fixed to the block 15 or moving with the same are supported on the axle 1 owing to the position of the control members.

If the hand wheel 43 is rotated to bring a cam lobe of maximum height in reach of the main pusher 27, the contact piece 30 at first goes towards the inside of the pusher 27 since the cam carrier 35 cannot go back and the selecting tilting member cannot tilt. However, by operating lever F, lever H is caused to pivot around its center I in order to allow the contact piece 30 to come out of the pusher 27. This takes place while the block 15 moves away from the axle 1 along which it is guided by the slots 26 of the plates 24 and 25. At the moment when this course is completed, the selecting tilting member is free and tilts until it is stopped by its catch 50 so that when the lever F reascends, the shoulder 52 engages the pin 5 and brings the control plate 2 into the position shown in Fig. 4, so that the speed controlling gearing, coupled by means of elastic connections and by toothed racks and the cranks C, D, E to the gear pin 6 or 9, is brought into the desired position.

Figure 8:
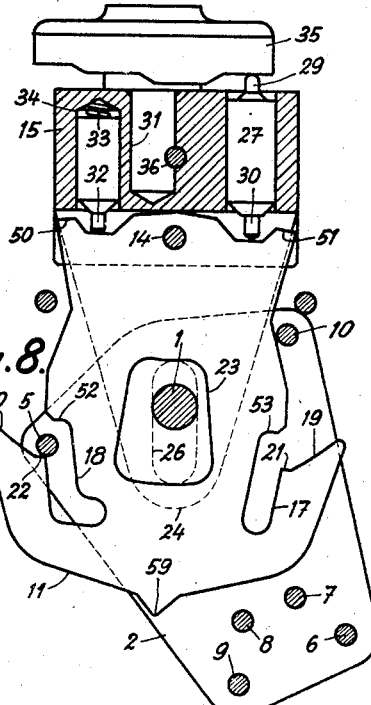
Figure 9:
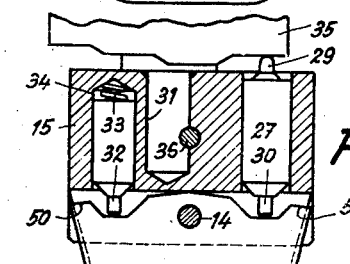
Figure 10:
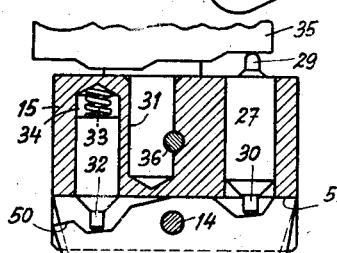

If the desired change in the operating conditions now requires a reversing of the control plate 2 into the other position, the cam 38 is rotated accordingly so that, during the first part of the selecting course, the counter pusher 32 can prevail and redress the selecting tilting member 11 as soon as it is free. During this redressing movement and owing to the simultaneous movement of the block 15, the pin 5 comes into contact with the face 20 (Fig. 8) which by means of the stop 22 takes it along so that at the end of the course the control plate 2 is again in its median position (Fig. 9) ready to be seized by the shoulder 53 of the selecting tilting member 11 after the latter has been brought into the position shown in Fig. 10. The downward movement of the block 15 provokes the oscillation of the control plate 2 in order to bring it into the position shown in Fig. 1.

If in the one or the other inclined position of a selecting tilting member the operating conditions to be imparted to the machine do not require a change in the position of the said tilting member, the vertical movement of the block 15, in spite of this, is possible, for the pin 5 or 10 respectively in engagement with the shoulder 52 or 53 is free to move in the cut-out 17 or 18 respectively of the selecting tilting member.

In any case, the effort necessary for displacing a control plate is obtained by parts susceptible of bearing a stress while, at a certain moment, being sufficiently free for being actuated by springs strained according to the requirements of the operating conditions.

What I claim is:

1. In a selecting control device, parts to be displaced, main pushers including spring-loaded contact pieces able to move into the interior of said main pushers, counter pushers acting in opposition to said main pushers, selecting tilting members in constant contact with said counter pushers and movable into different positions determining the displacements of said parts, means for connecting said selector members to said parts, adjustable cams contacting said main pushers to determine the height of said main pushers relative to the axis of rotation of said selecting tilting members, means retaining said selectors against tilting movement, and means for disengaging said retaining means to release said selectors for tilting movement.

2. In a selecting control device, parts to be displaced, a block, main pushers provided on said block, spring-loaded contact pieces movable into the interior of said main pushers, counter pushers provided on said block, an axle mounted on said block, selecting members carried by said axle and constantly in contact with said counter pushers said members being tiltable into different positions determining the displacement of said parts, means for connecting said tilting members to said parts, and adjustable cams contacting said main pushers to determine the height thereof relative to the axis of rotation of said selecting tilting members.

3. In a selecting control device, parts to be displaced, a block, main pushers provided on said block, counter pushers provided on said block and opposing the action of said main pushers, an axle mounted on said block, selecting members carried by said axle and constantly in contact with said counter pushers said members being tiltable into different positions determining the displacement of said parts, means for connecting said tilting members with said parts, another axle mounted on said block, and adjustable cams concentrically placed on said other axle and contacting said main pushers to determine the height thereof relative to the axis of rotation of said selecting tilting members.

4. In a selecting control device, parts to be displaced, a stationary axle, oscillating control plates mounted on said stationary axle and connected to said parts to be displaced, a block, main pushers provided on said block, counter pushers provided on said block, an axle mounted on said block, selecting members carried by said axle in constant contact with said counter pushers, said members being tiltable into different positions determining the displacement of said parts, and adjustable cams contacting said main pushers to determine the height thereof relative to the axis of rotation of said selecting tilting members.

5. In a selecting control device, parts to be displaced, a stationary axle, oscillating control plates mounted on said stationary axle and connected to said parts to be displaced, pins carried by said plates, a block, main pushers provided on said block, counter pushers provided on said block, an axle mounted on said block, selecting members attached to said axle in constant contact with said counter pushers and having inclined surfaces and shoulders adapted alternately to cooperate with said pins, according as said selecting tilting members are in one or another position imposed to them by said main pushers previous to each change in the relative position of said parts to be displaced, and adjustable cams contacting said pushers to determine the height thereof relative to the axis of rotation of said selecting tilting members.

6. In a selecting control device according to claim 5, said inclined surfaces being formed as surfaces whose curvature is concentric with said axle.

7. In a selecting control device, parts to be displaced, a stationary axle, oscillating control plates mounted on said stationary axle and connected to said parts to be displaced, pin carried by said plates, a block, main pushers provided on said block, counter pushers provided on said block, an axle mounted on said block, selecting tilting plates attached to said axle in constant contact with said counter pushers and having side faces symmetrical with regard to the longitudinal axis of said selecting tilting plates, said side faces comprising inclined surfaces and shoulders adapted alternately to cooperate with said pins, according as said selecting tilting plates are in one or another position imposed to them by said main pushers previous to each change in the relative position of said parts to be displaced, said selecting tilting members further comprising cut-outs allowing said block to carry out translation movements without influencing the position of said control plates, and cams destined to determine the height of said main pushers relative to the axis of rotation of said selecting tilting plates.

8. In a selecting control device according to claim 5, said selecting tilting members, said block, said main and counter pushers and said cams forming together a displaceable unit, a means actuating said unit from the outside to displace said unit, said block having cut-outs traversed by said stationary axle to guide said unit on displacement.

9. A selecting control device according to claim 5 for control of a machine having an engaging and disengaging lever, wherein said selecting tilting members, said block, said main and counter pushers and said cams form together a displaceable unit movable by said engaging and disengaging lever, said block having cut-outs traversed by said stationary axle to guide said unit on displacement.

10. A selective control device comprising, a plurality of members to be displaced, a plurality of selectors tiltable into different positions determining the displacements of said members, means for connecting said selectors to said members, a plurality of movable abutments engageable with said selector members to tilt the same, adjustable means contacting said abutments to determine the position to which said selectors will tilt, means retaining said selectors against tilting movement, and means for disengaging said retaining means to release said selectors for tilting movement.

11. A selective control device, comprising parts to be displaced, a reciprocatory block, selecting members pivoted on said block and tiltable into different positions determining the displacements of said parts, changeable bearing points engaging said members to tilt them into a predetermined position previously to the moving of said parts to be displaced, and means for retaining said tilting members in a position of rest relatively to said block during displacement of said parts.

12. A selective control device according to claim 11 wherein said selecting members are arranged to transmit only simple pressure force between said block and said displaceable parts.

ERNEST ALPHONSE DERUNGS.